United States Patent
Kurotaki et al.

(10) Patent No.: US 11,822,508 B2
(45) Date of Patent: Nov. 21, 2023

(54) DISPLAY DEVICE, ELECTRONIC WATCH, DISPLAY METHOD, AND NON-TRANSITORY RECORDING MEDIUM

(71) Applicant: CASIO COMPUTER CO., LTD., Tokyo (JP)

(72) Inventors: Asahi Kurotaki, Tachikawa (JP); Takaharu Ashikaga, Kokubunji (JP); Takeshi Hanada, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/179,507

(22) Filed: Feb. 19, 2021

(65) Prior Publication Data
US 2021/0263882 A1    Aug. 26, 2021

(30) Foreign Application Priority Data

Feb. 25, 2020    (JP) .................. 2020-029026

(51) Int. Cl.
*G06F 17/00*    (2019.01)
*G06F 15/02*    (2006.01)
*G06Q 10/1093*    (2023.01)
*G06F 1/16*    (2006.01)

(52) U.S. Cl.
CPC .......... *G06F 15/0266* (2013.01); *G06F 1/163* (2013.01); *G06Q 10/1095* (2013.01)

(58) Field of Classification Search
CPC . G06F 15/0266; G06F 1/163; G06Q 10/1095; G04G 21/04; G04G 9/0064; G04C 17/0091
See application file for complete search history.

(56) References Cited

U.S. PATENT DOCUMENTS

| | | | | |
|---|---|---|---|---|
| 2008/0151700 A1* | 6/2008 | Inoue | ............ | B60K 37/02 |
| | | | | 116/284 |
| 2014/0347289 A1* | 11/2014 | Suh | ............ | G06F 3/04847 |
| | | | | 345/3.1 |
| 2015/0378320 A1* | 12/2015 | Knight | ............ | G04G 11/00 |
| | | | | 368/107 |
| 2016/0179353 A1 | 6/2016 | Iskander | | |

(Continued)

FOREIGN PATENT DOCUMENTS

| | | |
|---|---|---|
| EP | 2642355 A1 | 9/2013 |
| JP | S60-093989 U | 6/1985 |

(Continued)

OTHER PUBLICATIONS

Chandel, Alok, and Matthew Tait. "Dynamically Adjusting the Placement of Digital Content on a Watch Face to Avoid Obstruction by Watch Hands." (2017) (Year: 2017).*

(Continued)

*Primary Examiner* — Andrew T McIntosh
(74) *Attorney, Agent, or Firm* — SCULLY, SCOTT, MURPHY & PRESSER PC (57) ABSTRACT

A display device includes at least one processor and a display. The processor acquires one or a plurality of pieces of schedule information each including information of a starting time and information of an ending time and causes the display to display a time remaining between a present time and the starting time or a time remaining between the present time and the ending time.

15 Claims, 10 Drawing Sheets

(56) References Cited

U.S. PATENT DOCUMENTS

| | | |
|---|---|---|
| 2017/0269715 A1 | 9/2017 | Kim et al. |
| 2017/0344535 A1* | 11/2017 | Shima .................... G09G 3/025 |
| 2018/0039232 A1 | 2/2018 | Abramov et al. |
| 2018/0107365 A1* | 4/2018 | Kyung .................... G09G 5/14 |
| 2018/0231940 A1* | 8/2018 | Kojima .................... G04F 8/006 |
| 2019/0334907 A1 | 10/2019 | Rodden et al. |
| 2021/0014287 A1* | 1/2021 | Kimball ................ H04L 65/403 |
| 2021/0049558 A1* | 2/2021 | Kon .................... G06Q 10/1093 |

FOREIGN PATENT DOCUMENTS

| | | |
|---|---|---|
| JP | H06-018678 A | 1/1994 |
| JP | H07-078545 B2 | 8/1995 |
| JP | 2000-029941 A | 1/2000 |
| JP | 2008-175800 A | 7/2008 |
| JP | 2011-067281 A | 4/2011 |
| JP | 2012-054710 A | 3/2012 |
| JP | 2018-109603 A | 7/2018 |
| JP | 2018-132302 A | 8/2018 |
| JP | 2019-105658 A | 6/2019 |

OTHER PUBLICATIONS

Notice of Reasons for Refusal dated May 31, 2022 received in Japanese Patent Application No. JP 20220-029026 together with an English language translation.
Notice of Reasons for Refusal dated May 31, 2022 received in Japanese Patent Application No. JP 2020-029026 together with an English language translation.
Notice of Reasons for Refusal dated Mar. 22, 2022 received in Japanese Patent Application No. JP 2020-029026 together with an English language translation.
Notice of Reasons for Refusal dated Oct. 4, 2022 received in Japanese Patent Application No. JP 2020-029026.
U.S. Appl. No. 2015/0378320 A1, filed Dec. 31, 2015, Apr. 8, 2022.
Office Action dated Jul. 24, 2023 received in U.S. Appl. No. 17/179,569.

* cited by examiner

DISPLAY DEVICE, ELECTRONIC WATCH, DISPLAY METHOD, AND NON-TRANSITORY RECORDING MEDIUM

CROSS-REFERENCE TO RELATED APPLICATION

This application is based upon and claims the benefit of priority under 35 USC 119 of Japanese Patent Application No. 2020-029026, filed on Feb. 25, 2020, the entire disclosure of which, including the description, claims, drawings, and abstract, is incorporated herein by reference in its entirety.

FIELD

This application relates generally to a display device, an electronic watch, a display method, and a non-transitory recording medium.

BACKGROUND

Display devices displaying scheduled times of predetermined schedules have been used. For example, Unexamined Japanese Patent Application Publication No. 2011-67281 discloses a biological information monitoring device displaying a time when a user leaves a room and a scheduled time when the user returns to the room.

SUMMARY

A display device according to one embodiment includes:
at least one processor; and
a display,
wherein the processor
acquires one or a plurality of pieces of schedule information each including information of a starting time and information of an ending time, and
causes the display to display a time remaining between a present time and the starting time or a time remaining between the present time and the ending time.

BRIEF DESCRIPTION OF THE DRAWINGS

A more complete understanding of this application can be obtained when the following detailed description is considered in conjunction with the following drawings, in which.

DETAILED DESCRIPTION

A display device and an electronic watch according to an embodiment of the present disclosure will be described below referring to drawings.

Figure 1:
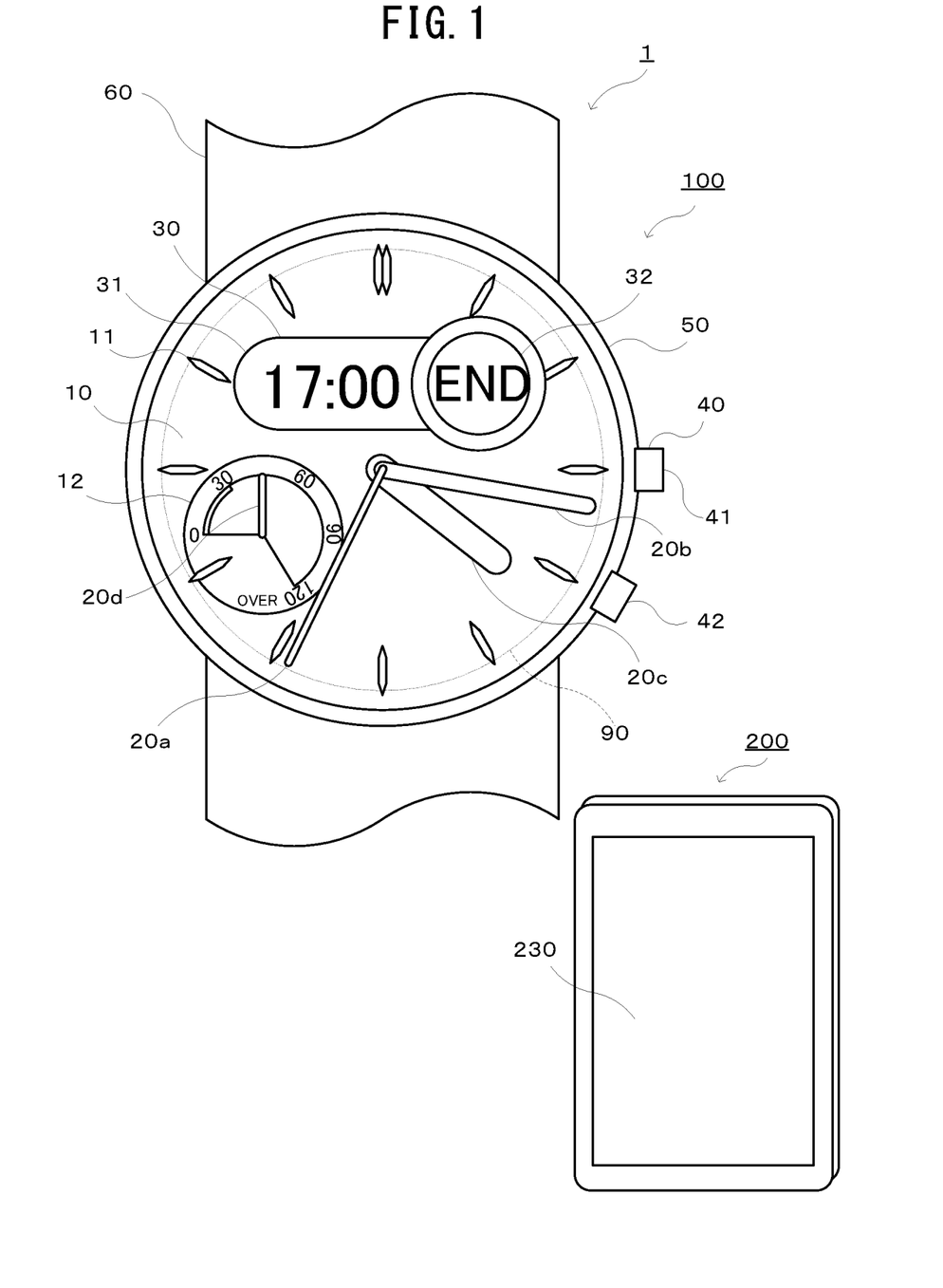
FIG. 1 is a diagram illustrating an electronic watch and a terminal device according to an embodiment of the present disclosure.
Figure 2:
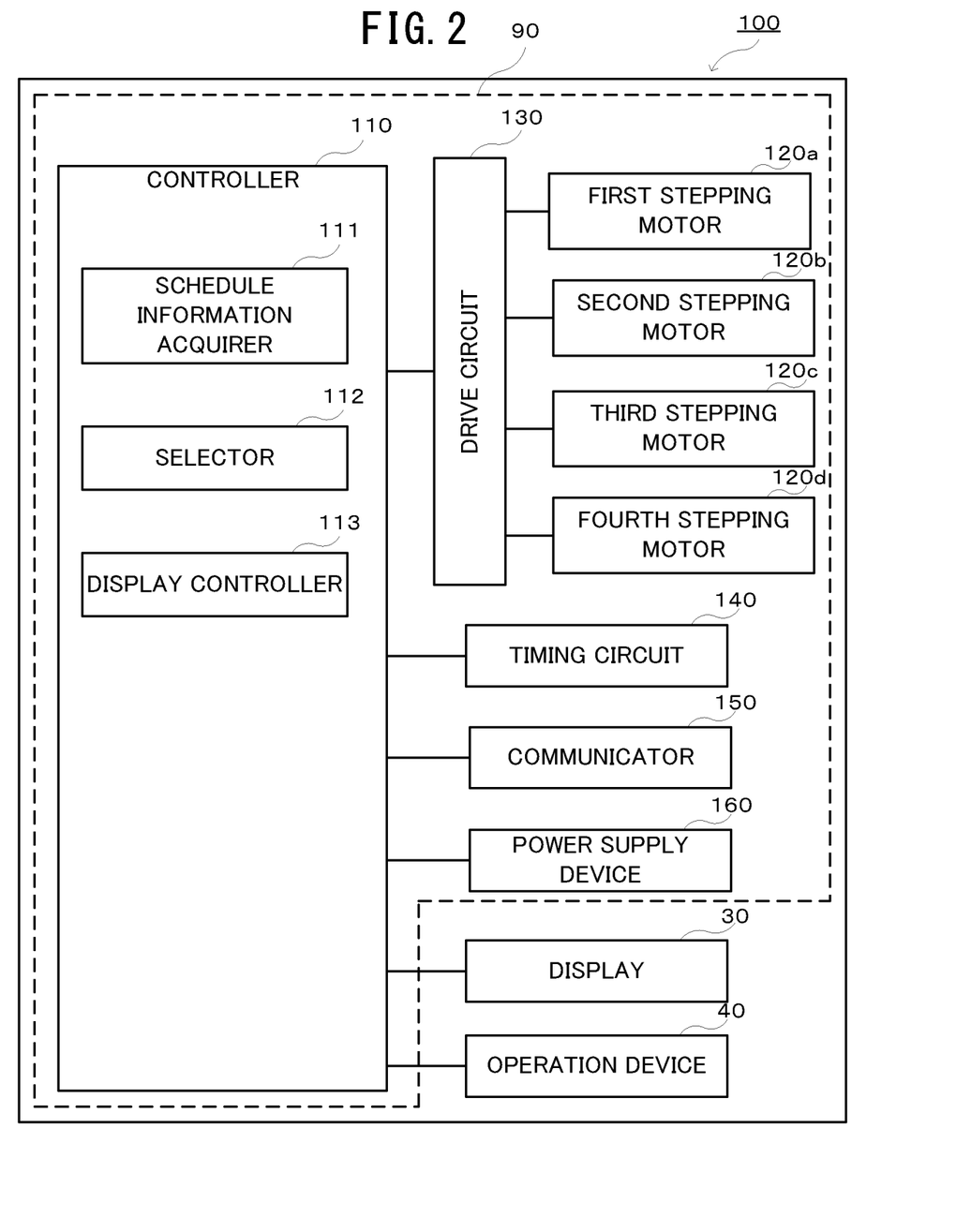
FIG. 2 is a block diagram illustrating a configuration of a display device according to the embodiment of the present disclosure.

An electronic watch 1 according to the present embodiment is a watch including a dial 10, hands 20a to 20d, a display 30, an operation device 40, a case 50, a band 60, and a drive device 90, as illustrated in FIG. 1. The electronic watch 1 acquires one or a plurality of pieces of schedule information each being transmitted from a terminal device 200 and including information of a starting time and information of an ending time and displays schedule information. The dial 10, the hands 20a to 20d, the display 30, the operation device 40, the case 50, the band 60, and the drive device 90 constitute a display device 100. The drive device 90 includes first to fourth stepping motors 120a to 120d, a drive circuit 130, a timing circuit 140, a communicator 150, a power supply device 160, and a controller 110, as illustrated in FIG. 2.

The dial 10 illustrated in FIG. 1 is an indicator panel including a main dial 11 indicating the present time and a sub-dial 12 indicating a time remaining until an ending time. The sub-dial 12 fanwise displays a time indicating a remaining time ranging from 0 to 120 minutes and further displays "OVER" being a display indicating that the remaining time exceeds 120 minutes being a preset first reference time.

The hand 20a is a second hand indicating seconds, the hand 20b is a minute hand indicating minutes, the hand 20c is an hour hand indicating hours, and the hand 20d is a retrograde hand indicating a remaining time. The hands 20a to 20c are rotatably provided with respect to the rotation axis of the main dial 11. The hand 20d is provided in a fanwise reciprocatively movable manner in clockwise and counterclockwise directions with respect to the rotation axis of the sub-dial 12. The hand 20d indicates a remaining time fanwise displayed on the sub-dial 12 or "OVER" being a display indicating that the remaining time exceeds 120 minutes being the preset first reference time. The dial 10 and the hands 20a to 20d constitute a hand display.

The display 30 includes a digital display displaying a plurality of numerals or characters and is configured with a liquid crystal display (LCD), an organic electro-luminescence (EL), or the like. The display 30 includes a first display 31 digitally displaying characters, the present time, an ending time, or a remaining time, and a second display 32 digitally displaying characters or an icon.

The operation device 40 receives an instruction to perform display switching or mode switching in accordance with a user input. The operation device 40 includes a first button 41 and a second button 42. The first button receives an instruction to display an ending time or a remaining time.

The case 50 includes a cover glass covering the dial 10 and the hands 20a to 20d and houses the hands 20a to 20d, the dial 10, and the drive device 90. The band 60 is attached to the case 50 and is to be worn on a wrist being a user's body. The band 60 functions as an attacher.

The first stepping motor 120a illustrated in FIG. 2 drives the hand 20a being a second hand through one or a plurality of gears. The second stepping motor 120b drives the hand 20b being a minute hand through one or a plurality of gears. The third stepping motor 120c drives the hand 20c being an hour hand through one or a plurality of gears. The hands 20a to 20c display the present time with the configuration. The fourth stepping motor 120d drives the hand 20d being a hand indicating a remaining time, through one or a plurality of gears.

The drive circuit 130 drives the first to fourth stepping motors 120a to 120d in accordance with an instruction from the controller 110.

The timing circuit 140 is a counter circuit including an oscillator circuit and a frequency dividing circuit and counting the present time; and a circuit oscillating in combination with an oscillator such as crystal is used as the oscillator circuit, and the oscillator circuit generates a unique frequency signal and outputs the signal to the frequency dividing circuit. The frequency dividing circuit divides a signal input from the oscillator circuit into frequency signals and outputs the signals. The timing circuit 140 counts the number of times a predetermined frequency signal is output from the frequency dividing circuit and counts the present time by adding the number to an initial time. Further, the timing circuit 140 corrects the present time, based on time information received by the communicator 150.

The communicator 150 receives one or a plurality of pieces of schedule information each being transmitted from the terminal device 200 and including information of a starting time and information of an ending time, and time information. The time information includes time information transmitted from a Global Positioning System (GPS) satellite and time information provided by a standard time and frequency radio wave. The communicator 150 is configured with a wireless communication module such as a wireless local area network (LAN) or Bluetooth (registered trademark).

The power supply device 160 includes a battery and a DC-DC converter and is configured to be able to keep output voltage constant during operation and operate the display device 100 continuously and stably for a long period.

The controller (processor) 110 includes a central processing unit (CPU), a read only memory (ROM), and a random access memory (RAM). The controller 110 functions as a schedule information acquirer 111, a selector 112, and a display controller 113 by reading a program stored in the ROM into the RAM and executing the program.

The schedule information acquirer 111 acquires one or a plurality of pieces of schedule information each being transmitted from the terminal device 200 and including information of a starting time and information of an ending time and updates schedule information stored in the RAM to schedule information, the ending time of which is set to a time within a set time from the present time. For example, the set time is 24 hours. Specifically, when a reference period elapses after transmission of the last transmission request information, the schedule information acquirer 111 transmits transmission request information to the terminal device 200 and receives schedule information being transmitted from the terminal device 200 and including information of a starting time and information of an ending time.

When determining that schedule information in progress exists in one or a plurality of pieces of schedule information stored in the RAM, the selector 112 selects the schedule information. A schedule, schedule information of which includes information of a starting time earlier than the present time and information of an ending time later than the present time, is herein assumed to be a schedule in progress. When determining that a schedule in progress does not exist, the selector 112 selects schedule information including information of the earliest starting time out of the pieces of schedule information stored in the RAM and sets a period until the starting time of the schedule information as a temporary schedule and sets the starting time as the ending time of the temporary schedule.

The display controller 113 displays a time remaining between the present time and an ending time by the hand 20d, based on schedule information or a temporary schedule selected by the selector 112. Specifically, the display controller 113 drives the fourth stepping motor 120d by controlling the drive circuit 130 and causes the hand 20d to indicate a time remaining until a remaining-time-ending time displayed on the sub-dial 12 or "OVER" indicating that the remaining time exceeds 120 minutes being the first reference time. Further, when the first button 41 is pressed, the display controller 113 displays the ending time or the time remaining until the ending time on the display 30, based on the schedule information or the temporary schedule selected by the selector 112. Specifically, the display controller 113 displays the ending time when the time remaining until the ending time is 10 minutes being a second reference time or more and executes per-second countdown display of the time remaining until the ending time when the time remaining until the ending time is less than 10 minutes.

Figure 3:
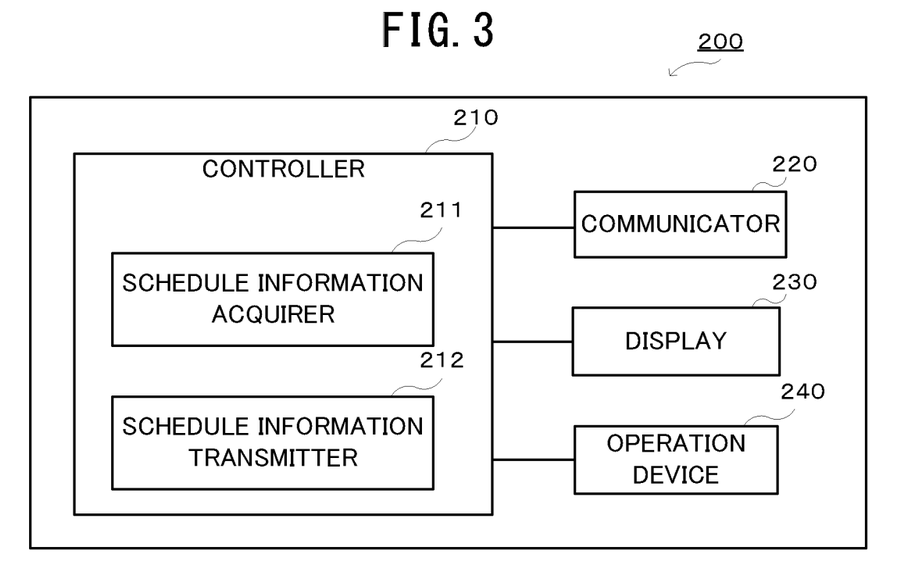
FIG. 3 is a block diagram illustrating a configuration of the terminal device according to the embodiment of the present disclosure.

As illustrated in FIG. 3, the terminal device 200 includes a controller 210, a communicator 220, a display 230, an operation device 240, a ROM, and a RAM. For example, the terminal device 200 is configured with a smartphone or a tablet personal computer (PC). The ROM is configured with a nonvolatile memory such as a flash memory and stores a program for the controller 210 to provide various functions. The RAM is configured with a volatile memory and is used as a work area for the controller 210 to execute a program for performing various types of processing. The RAM further stores one or a plurality of pieces of schedule information each including information of a starting time and information of an ending time.

The controller 210 is configured with a CPU or the like. The controller 210 functions as a schedule information acquirer 211 and a schedule information transmitter 212 by executing a program stored in the ROM.

The schedule information acquirer 211 acquires one or a plurality of pieces of schedule information each including information of a starting time and information of an ending time and being acquired by the operation device 240 or received by the communicator 220 and stores the schedule information into the RAM.

When determining that transmission request information transmitted from the display device 100 is received, the schedule information transmitter 212 transmits one or a plurality of pieces of schedule information each including information of a starting time and information of an ending time to the display device 100 through the communicator 220.

The communicator 220 transmits data representing one or a plurality of pieces of schedule information each including information of a starting time and information of an ending time to the display device 100. The communicator 220 is configured with a wireless communication module such as a wireless LAN or Bluetooth (registered trademark), similarly to the aforementioned communicator 150.

The display 230 displays one or a plurality of pieces of input schedule information each including information of a starting time and information of an ending time, and an image required for operation and is configured with an LCD, an organic EL, or the like.

The operation device 240 receives one or a plurality of pieces of schedule information each including information of a starting time and information of an ending time, in accordance with a user input. The operation device 240 and the display 230 constitute a touch panel display device.

Next, processing executed by the display device 100 and the terminal device 200 that are configured as described above will be described.

Figure 4:
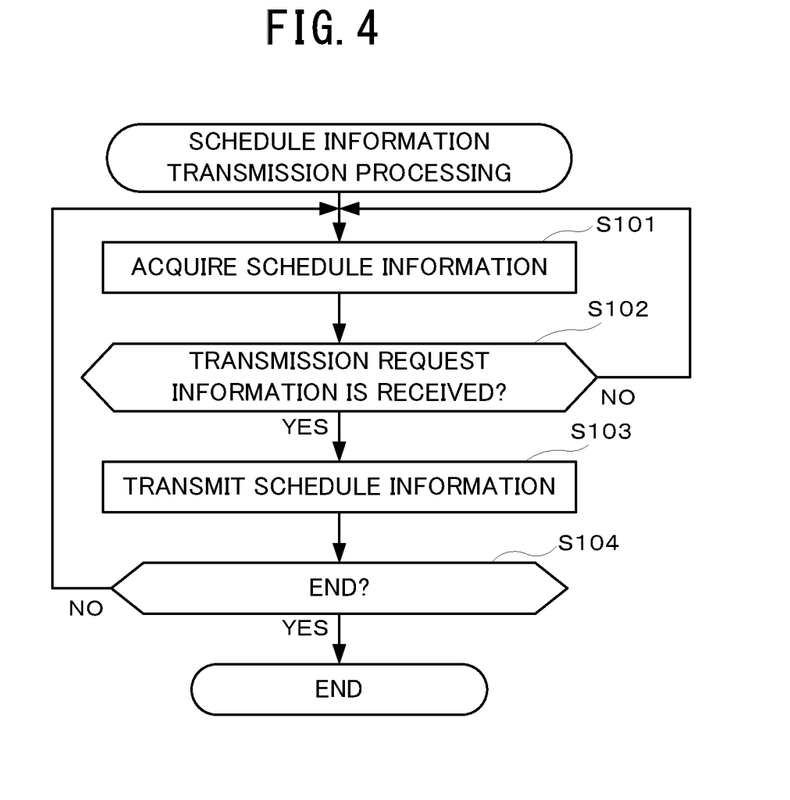
FIG. 4 is a flowchart illustrating schedule information transmission processing according to the embodiment of the present disclosure.

In response to an instruction to start processing given by a user, the terminal device 200 starts schedule information transmission processing illustrated in FIG. 4. In response to an instruction to start processing given by a user, the display device 100 starts display processing illustrated in FIG. 5. The schedule information transmission processing executed by the terminal device 200 and the display processing executed by the display device 100 will be described below by use of flowcharts.

When the schedule information transmission processing is started, the schedule information acquirer 211 acquires one or a plurality of pieces of schedule information each including information of a starting time and information of an ending time and being acquired by the operation device 240 or received by the communicator 220 and stores the schedule information into the RAM (Step S101). Next, the schedule information transmitter 212 determines whether transmission request information transmitted from the display device 100 is received (Step S102).

When determining that transmission request information is not received (Step S102: NO), the schedule information transmitter 212 returns to Step S101 and repeats Step S101 and Step S102. When determining that transmission request information is received (Step S102: YES), the schedule information transmitter 212 transmits one or a plurality of pieces of schedule information each including information of a starting time and information of an ending time to the display device 100 through the communicator 220 (Step S103).

Next, the schedule information transmitter 212 determines whether an instruction to end the schedule information transmission processing is input (Step S104). When an instruction to end the schedule information transmission processing is not input (Step S104: NO), the schedule information transmitter 212 returns to Step S101 and repeats Step S101 to Step S104. When an instruction to end the schedule information transmission processing is input (Step S104: YES), the schedule information transmitter 212 ends the schedule information transmission processing.

Figure 5:
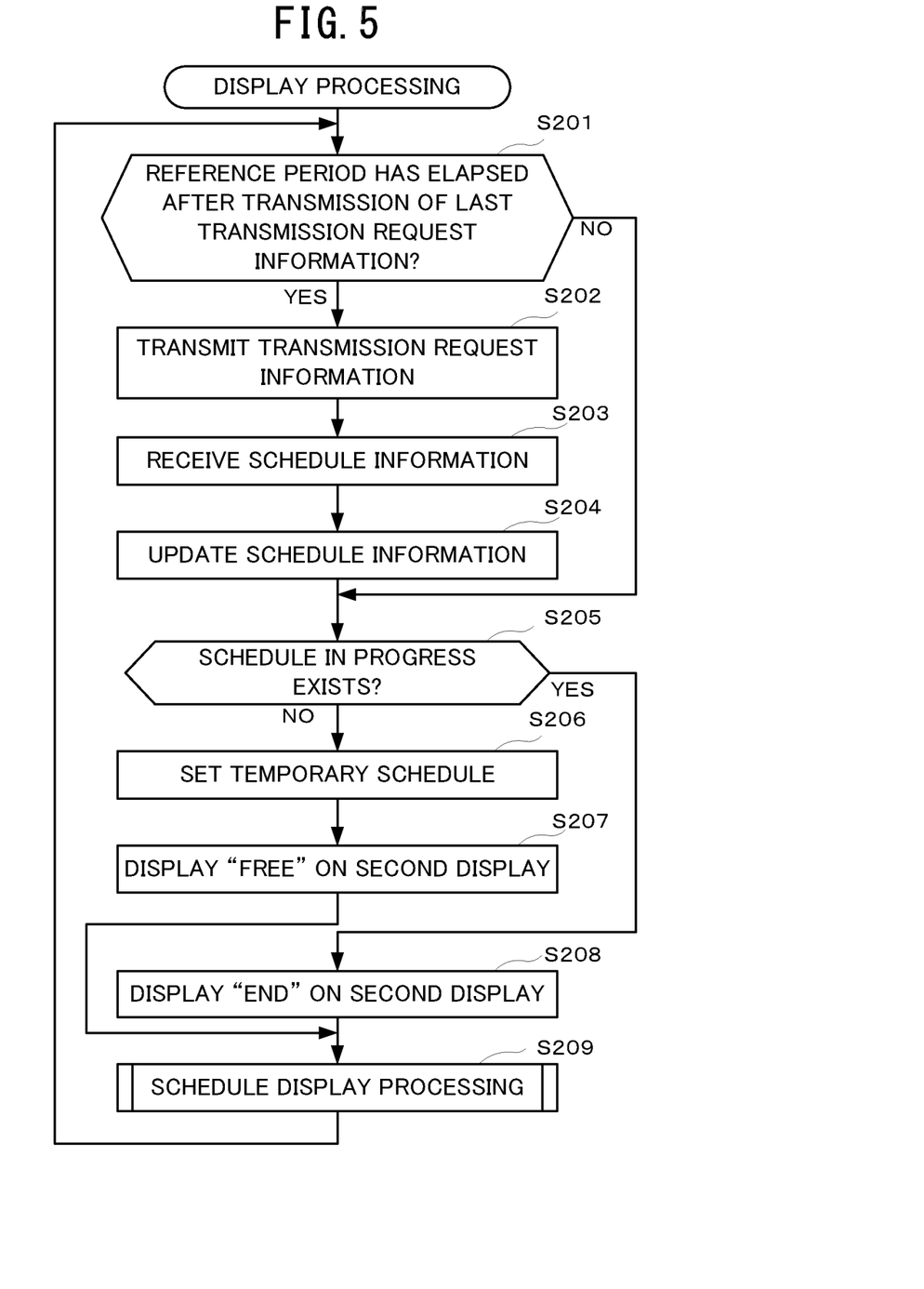
FIG. 5 is a flowchart illustrating display processing according to the embodiment of the present disclosure.

When the display processing is started, the schedule information acquirer 111 in the display device 100 determines whether a reference period has elapsed after transmission of the last transmission request information (Step S201). For example, the reference period is 5 minutes. When determining that the reference period has not elapsed after transmission of the last transmission request information (Step S201: NO), the schedule information acquirer 111 advances to Step S205. When determining that the reference period has elapsed after transmission of the last transmission request information (Step S201: YES), the schedule information acquirer 111 transmits transmission request information to the terminal device 200 through the communicator 220 (Step S202).

Next, the schedule information acquirer 111 receives one or a plurality of pieces of schedule information each being transmitted from the terminal device 200 and including information of a starting time and information of an ending time (Step S203). The schedule information acquirer 111 updates schedule information stored in the RAM to schedule information, the ending time of which is set to a time within a set time from the present time, in the received pieces of schedule information (Step S204). For example, the set time is 24 hours.

Next, the selector 112 determines whether schedule information in progress exists in the one or a plurality of pieces of schedule information stored in the RAM (Step S205). A schedule, schedule information of which includes information of a starting time earlier than the present time and information of an ending time later than the present time, is herein assumed to be a schedule in progress.

When determining that a schedule in progress does not exist (Step S205: NO), the selector 112 selects schedule information including information of the earliest starting time out of the pieces of schedule information stored in the RAM and sets a period until the starting time of the schedule as a temporary schedule (Step S206). In this case, the starting time of the next schedule is set to be the ending time of the temporary schedule. Next, the display controller 113 displays "FREE" indicating that no schedule is set, on the second display 32 (Step S207).

When a schedule in progress is determined to exist (Step S205: YES), the display controller 113 displays "END" indicating the end of the schedule in progress on the second display 32 (Step S208). Next, the selector 112 executes schedule display processing (Step S209).

Figure 6:
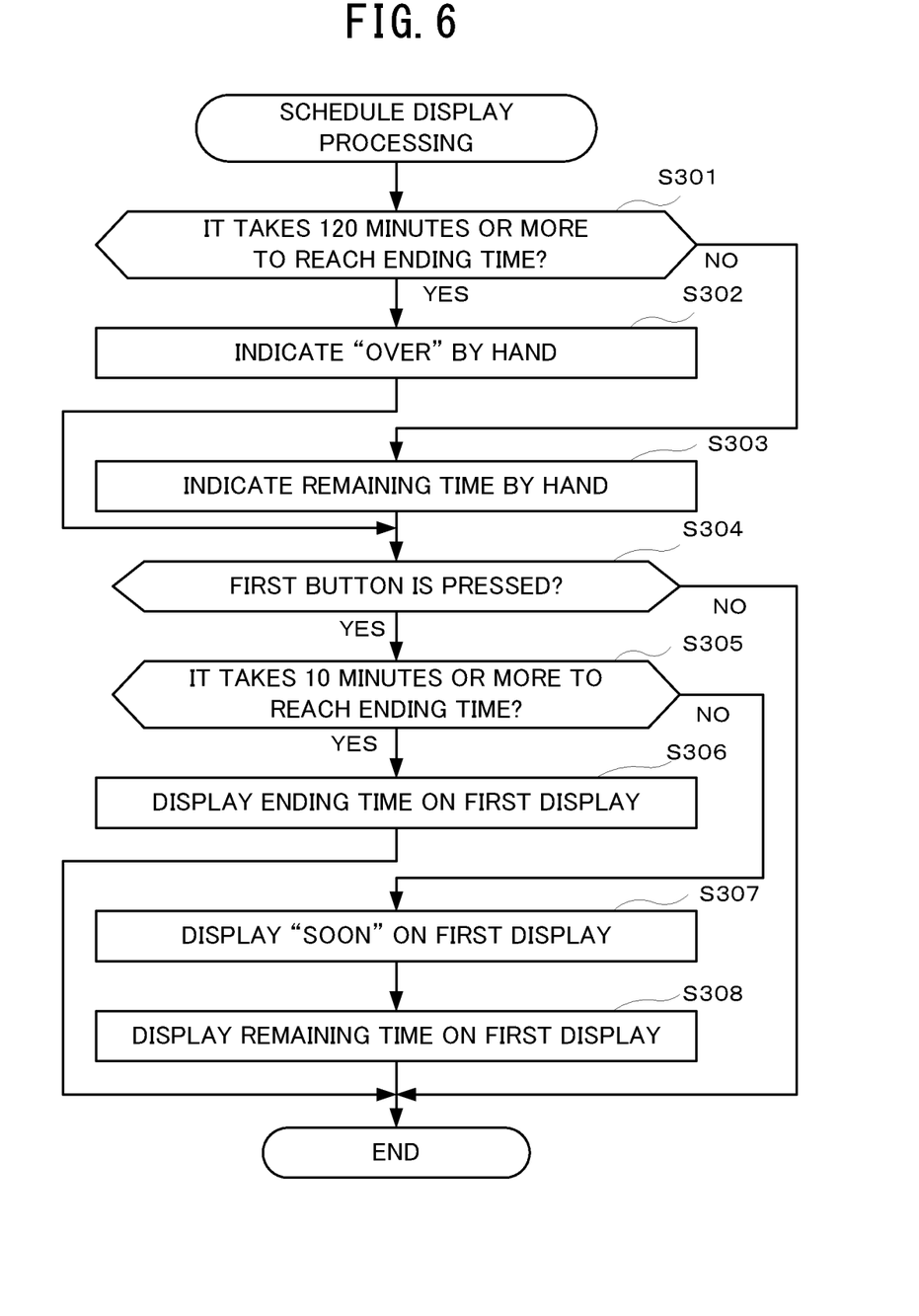
FIG. 6 is a flowchart illustrating schedule display processing according to the embodiment of the present disclosure.

When the schedule display processing illustrated in FIG. 6 is executed, the display controller 113 determines whether it takes 120 minutes being the first reference time or more to reach the ending time of a schedule in progress or a temporary schedule (Step S301). When determining that it takes 120 minutes or more to reach the ending time (Step S301: YES), the display controller 113 drives the fourth stepping motor 120d by controlling the drive circuit 130 and causes the hand 20d to indicate "OVER" indicating that the remaining time exceeds 120 minutes (Step S302).

When determining that it takes less than 120 minutes to reach the ending time (Step S301: NO), the display controller 113 drives the fourth stepping motor 120d by controlling the drive circuit 130 and causes the hand 20d to indicate the time remaining until the ending time displayed on the sub-dial 12 (Step S303).

Next, the display controller 113 determines whether the first button 41 is pressed (Step S304). When determining that the first button 41 is not pressed (Step S304: NO), the display controller 113 returns to the display processing illustrated in FIG. 5 and repeats Step S201 to Step S209. When determining that the first button 41 is pressed (Step S304: YES), the display controller 113 determines whether it takes 10 minutes being the second reference time or more to reach the ending time (Step S305). When determining that it takes 10 minutes or more to reach the ending time (Step S305: YES), the display controller 113 displays the ending time of the schedule in progress on the first display 31 (Step S306). When the first button 41 is not pressed, the first display 31 displays the present time or the date. Subsequently, the display controller 113 returns to the display processing illustrated in FIG. 5.

When determining that it takes less than 10 minutes to reach the ending time (Step S305: NO), the display controller 113 displays "SOON" indicating that the ending time of the schedule in progress is approaching on the first display 31 (Step S307). For example, a display time of "SOON" is one second. Next, the display controller 113 performs per-second countdown display of the time remaining until the ending time of the schedule in progress on the first display 31 (Step S308). Subsequently, the display controller 113 returns to the display processing illustrated in FIG. 5 and repeats Step S201 to Step S209.

Figure 7:
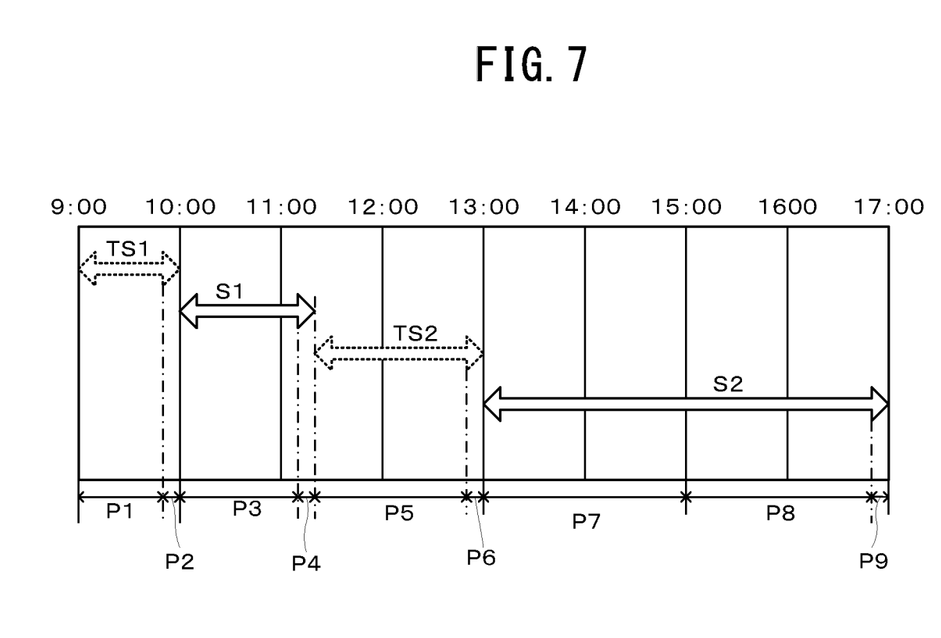
FIG. 7 is a diagram illustrating schedule information according to the embodiment of the present disclosure.

Next, the display processing executed by the display device 100 in an example of schedule information illustrated in FIG. 7 being input to the terminal device 200 will be described. The schedule information includes a schedule S1 and a schedule S2 each being set with a starting time and an ending time. Periods P1 and P2, and periods P5 and P6 are periods in which no schedule is set.

Figure 8:
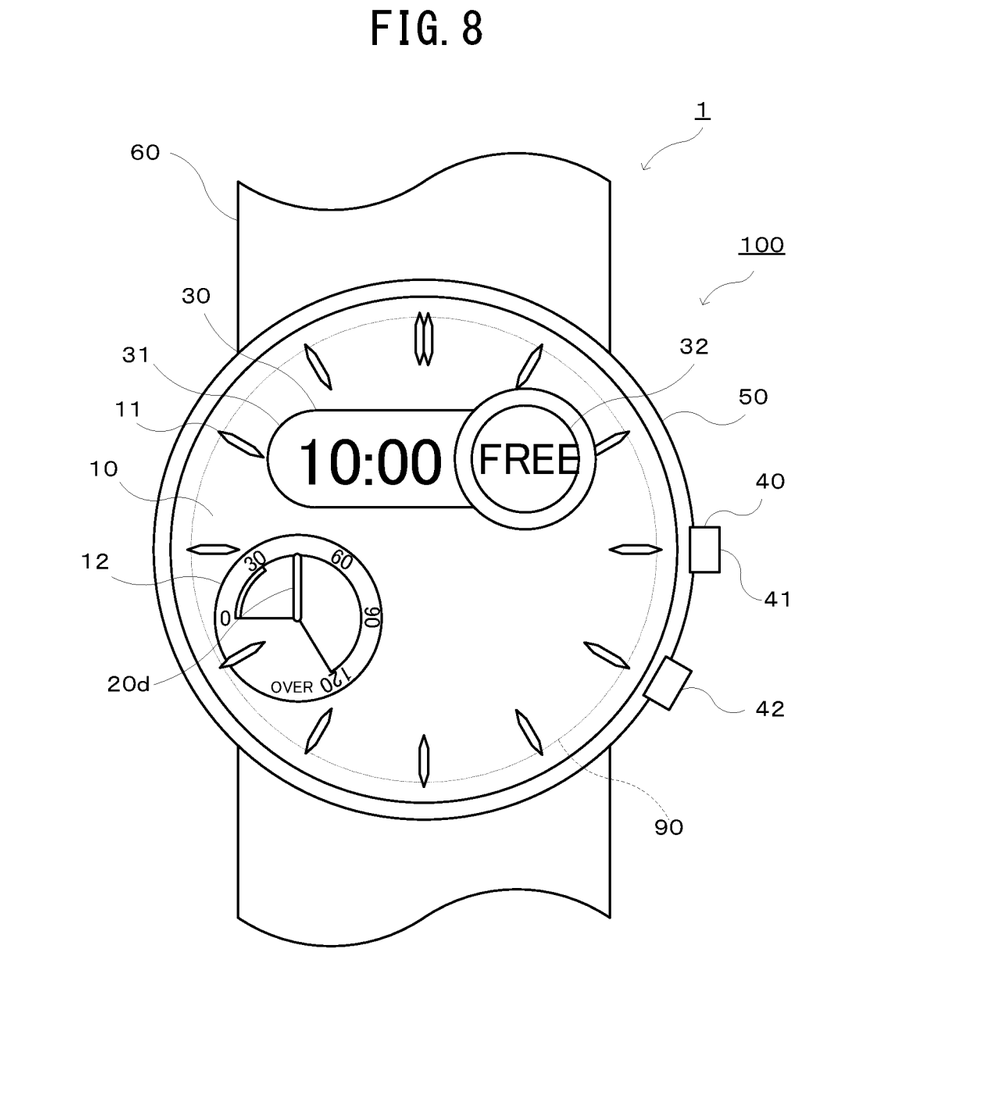
FIG. 8 is a diagram illustrating a display of the electronic watch according to the embodiment of the present disclosure.

The period P1 is a period in which no schedule is set and is a period from which the time remaining until the starting time of the next schedule S1 is 10 minutes or more. Therefore, when the present time is included in the period P1, a schedule in progress is determined not to exist (Step S205: NO in FIG. 5); and a period until the starting time of the schedule S1 being a schedule including information of the earliest starting time is set as a temporary schedule TS1 (Step S206 in FIG. 5). Next, the display controller 113 displays "FREE" indicating that no schedule is set, on the second display 32, as illustrated in FIG. 8 (Step S207 in FIG. 5). The display controller 113 causes the hand 20d to indicate the time remaining until the ending time of the temporary schedule TS1 by driving the fourth stepping motor 120d (Step S303 in FIG. 6). Next, when determining that the first button 41 is pressed (Step S304: YES in FIG. 6), since it takes 10 minutes or more to reach the ending time (Step S305: YES in FIG. 6), the display controller 113 displays "10:00" being the ending time of the temporary schedule TS1 on the first display 31.

Figure 9A:
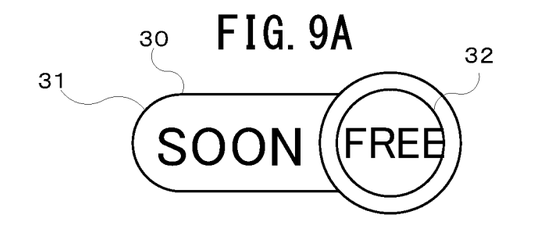
FIGS. 9A to 9D are diagrams illustrating displays on a display according to the embodiment of the present disclosure.
Figure 9B:
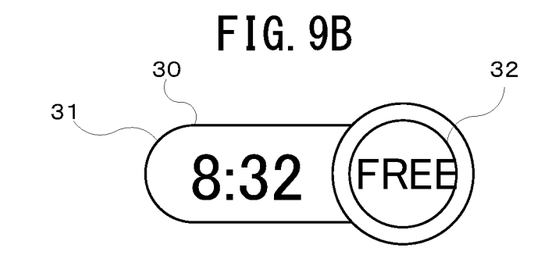

The period P2 is a period in which no schedule is set and is a period from which the remaining time until the starting time of the next schedule S1 is less than 10 minutes. Therefore, when the present time is included in the period P2, a period until the starting time of the schedule S1 is set as a temporary schedule TS1, similarly to the period P1 (Step S206 in FIG. 5). The display controller 113 causes the hand 20d to indicate the time remaining until the ending time of the temporary schedule TS1 by driving the fourth stepping motor 120d (Step S303 in FIG. 6). Next, when determining that the first button 41 is pressed (Step S304: YES in FIG. 6), since it takes less than 10 minutes to reach the ending time (Step S305: NO in FIG. 6), the display controller 113 displays "SOON" indicating that the ending time of the temporary schedule TS1 is approaching on the first display 31, as illustrated in FIG. 9A (Step S307 in FIG. 6). For example, a display time of "SOON" is one second. Next, the display controller 113 displays the time remaining until the ending time of the temporary schedule TS1 on the first display 31, as illustrated in FIG. 9B (Step S308 in FIG. 6).

Figure 9C:
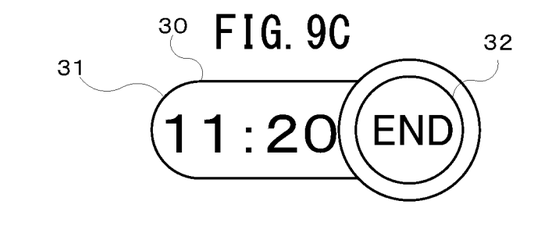

The period P3 is a period in which the schedule S1 is set and is a period from which the time remaining until the ending time of the schedule S1 is 10 minutes or more. Since a schedule in progress exists (Step S205: YES in FIG. 5), the display controller 113 displays "END" indicating the end of the schedule in progress on the second display 32, as illustrated in FIG. 9C (Step S208 in FIG. 5). The display controller 113 causes the hand 20d to indicate the time remaining until the ending time of the schedule S1 on the sub-dial 12 by driving the fourth stepping motor 120d (Step S303 in FIG. 6). Next, when determining that the first button 41 is pressed (Step S304: YES in FIG. 6), since it takes 10 minutes or more to reach the ending time (Step S305: YES in FIG. 6), the display controller 113 displays "11:20" being the ending time of the schedule S1 on the first display 31.

Figure 9D:
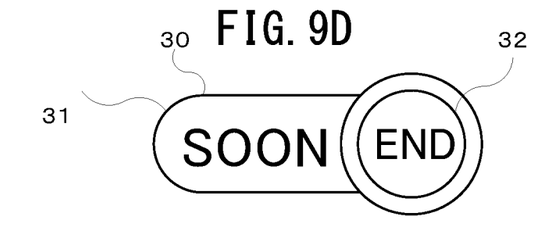

The period P4 is a period in which a schedule is set and is a period from which the time remaining until the ending time of the schedule S1 is less than 10 minutes. The display controller 113 causes the hand 20d to indicate the time remaining until the ending time of the schedule S1 by driving the fourth stepping motor 120d (Step S303 in FIG. 6). Next, when determining that the first button 41 is pressed (Step S304: YES in FIG. 6), since it takes less than 10 minutes to reach the ending time (Step S305: NO in FIG. 6), the display controller 113 displays "SOON" indicating that the ending time of the schedule S1 is approaching on the first display 31, as illustrated in FIG. 9D (Step S307 in FIG. 6). Next, the display controller 113 displays the time remaining until the ending time of the schedule S1 on the first display 31 (Step S308 in FIG. 6).

Processing operations similar to those in the period P1 and the period P2 are executed in the period P5 and the period P6, respectively.

Figure 10:
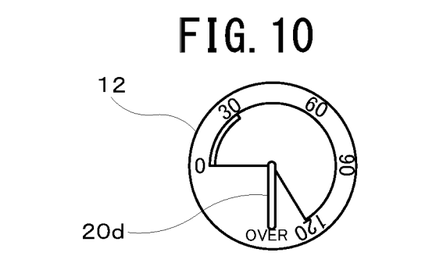
FIG. 10 is a diagram illustrating an operation of a hand display according to the embodiment of the present disclosure.

The period P7 is a period in which the schedule S2 is set and is a period from which the time remaining until the ending time of the schedule S2 is 120 minutes or more. Therefore, it is determined that it takes 120 minutes or more to reach the ending time (Step S301: YES in FIG. 6), and the display controller 113 causes the hand 20d to indicate "OVER" indicating that the remaining time exceeds 120 minutes by driving the fourth stepping motor 120d, as illustrated in FIG. 10 (Step S302 in FIG. 6). The remaining processing is executed similarly to the period P3.

Processing operations similar to those in the period P3 and the period P4 are executed in the period P8 and the period P9, respectively.

As described above, the electronic watch 1 and the display device 100 according to the present embodiment can perform countdown display of a remaining time by the hand 20d and, in a case of the first button 41 being pressed, can digitally display an ending time on the first display 31 when the time remaining until the ending time is 10 minutes or more and can digitally display the remaining time on the first display 31 when the time remaining until the ending time is less than 10 minutes. A user can intuitively learn a remaining time by countdown display of the remaining time by the hand 20d and can accurately learn an ending time by digital display of the ending time or the remaining time on the first display 31. Further, by a user merely pressing the first button 41, a display of "the ending time of a schedule in progress" on the first display 31 is switched to a display of "per-second countdown until the ending time" when the remaining time of the schedule in progress until the end becomes 10 minutes or less. The display allows a user to recognize that the ending time of the schedule is approaching and recognize the remaining time until the schedule ends; and therefore convenience is improved. Further, a user can recognize that there is a sufficient remaining time when the hand 20d indicates "OVER" indicating that the remaining time exceeds 120 minutes. Further, a user can learn that no schedule is in progress at that point by the second display 32 displaying "FREE." Further, as long as the schedule information acquirer 111 is connected to the terminal device 200, the schedule information acquirer 111 can automatically update schedule information by receiving one or a plurality of pieces of schedule information each being transmitted from the terminal device 200 and including information of a starting time and information of an ending time every time a reference period elapses; and therefore a remaining time can be displayed without a user performing an operation of starting a countdown, and thus user convenience is improved.

Modified Example

An example of the first display 31 displaying an ending time or the time remaining until the ending time when the first button 41 is pressed has been described in the aforementioned embodiment. The first display 31 has only to be able to display the ending time or the time remaining until the ending time; and the first display 31 may always display the ending time or the time remaining until the ending time. Thus, a user can confirm the ending time or the time remaining until the ending time displayed on the first display 31 without pressing the first button 41.

Figure 11:
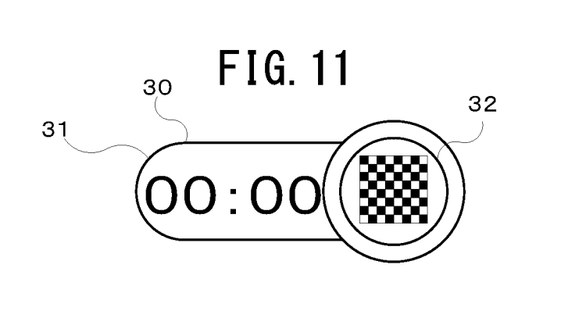
FIG. 11 is a diagram illustrating a display on a display according to a modified example.

An example of the second display 32 displaying "FREE" or "END" has been described in the aforementioned embodiment. The second display 32 may perform another type of display indicating progress of a schedule. For example, when the present time reaches an ending time included in schedule information, a checkered flag icon being an icon indicating an end may be displayed as illustrated in FIG. 11. Thus, a user can confirm arrival of the ending time.

While an example of the schedule information acquirer 111 receiving schedule information every time a reference period elapses has been described in the aforementioned embodiment, the schedule information acquirer 111 may receive schedule information in response to a user operation. Thus, the schedule information acquirer 111 can receive schedule information by a user operation at a timing when the user inputs the schedule information to the terminal device 200.

An example of the schedule information acquirer 111 updating schedule information stored in the RAM to schedule information, the ending time of which is set to a time within 24 hours from the present time, has been described in the aforementioned embodiment. The schedule information acquirer 111 may store schedule information according to capacity of the RAM. For example, the schedule information acquirer 111 may store a reference number of pieces of schedule information to be stored in the RAM. For example, the reference number is five. Thus, an area of the RAM storing schedule information can be reduced. Even in this case, schedule information can be automatically updated as long as the schedule information acquirer 111 is connected to the terminal device 200, and therefore occurrence of a problem that schedule information is not stored in the display device 100 can be prevented.

While an example of only one schedule being in progress has been described in the aforementioned embodiment, a case of a plurality of schedules progressing simultaneously may also be supported. In this case, the selector 112 selects one piece of schedule information out of a plurality of pieces of schedule information in progress and executes display based on the selected schedule information. For example, when determining that a plurality of pieces of schedule information in progress exists in a plurality of pieces of schedule information stored in the RAM, the selector 112 selects schedule information including information of the latest starting time out of the pieces of schedule information in progress. When subsequently determining that one piece of schedule information in progress is selected, the selector 112 selects the schedule information. When determining that a plurality of pieces of schedule information each including information of the latest starting time exists in the selected pieces of schedule information, the selector 112 selects schedule information including information of the earliest ending time out of the selected pieces of schedule information. Thus, even when a plurality of pieces of schedule information progresses simultaneously, schedule information including information of the latest starting time and information of the earliest ending time can be selected, and display based on the schedule information can be executed. Subsequently, information of an ending time included in the selected schedule information is digitally displayed on the first display 31, and countdown display of the remaining time is performed by the hand 20d. Thus, an ongoing schedule with the highest real time property can be automatically selected, and a model with a poor displaying ability can allow a user to recognize important schedule information.

While schedule information is notified to a user only by display in the aforementioned embodiment, a user may be notified of the present time reaching a starting time or an ending time included in schedule information by sound. Further, different sounds may be generated for a starting time and an ending time, respectively, in such a way that a user can hear the difference between the starting time and the ending time; and thus convenience may be improved.

A case of the display device 100 being used as the electronic watch 1 has been described in the aforementioned embodiment. The display device 100 may be used in a device other than the electronic watch 1, such as a table clock.

Further, a main part performing hand movement control processing executed by the display device 100 including the CPU, the RAM, and the ROM can be executed by use of a common information portable terminal (a smartphone or a tablet PC), a personal computer, or the like instead of a dedicated system. For example, a computer program for executing the aforementioned operations may be stored in a non-transitory computer-readable recording medium [such as a flexible disk, a compact disc read only memory (CD-ROM), or a digital versatile disc read only memory (DVD-ROM)] and be distributed; and an information terminal executing the aforementioned processing may be configured by installing the computer program on an information portable terminal or the like. Further, the computer program may be stored in a storage device included in a server device on a communication network such as the Internet; and an information processing device may be configured by downloading the computer program to a common information processing terminal or the like.

When the display device 100 is provided by role sharing between an operating system (OS) and an application program, cooperation between an OS and an application program, or the like, only the application program part may be stored in a non-transitory recording medium or a storage device.

Further, a computer program can be superposed on a carrier wave and be delivered through a communication network. For example, the computer program may be posted on a bulletin board system (BBS) on a communication network, and the computer program may be delivered through the network. Then, the aforementioned processing may be executed by starting the computer program and executing the program similarly to other application programs under control of an OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display device comprising:
at least one processor configured to:
acquire schedule information including a starting time and an ending time;
determine whether the starting time is earlier than a present time and the ending time is later than the present time; and
in response to determining that the starting time is earlier than the present time and the ending time is later than the present time,
determine whether a time remaining until the ending time is a reference time or more;
in response to determining that the time remaining until the ending time is the reference time or more, cause a display to display the ending time; and
in response to determining that the time remaining until the ending time is not the reference time or more, cause the display to display the time remaining until the ending time instead of the ending time.

2. The display device according to claim 1,
wherein the at least one processor is configured to:
in response to determining that the starting time of the schedule information is not earlier than the present time and the ending time of the schedule information is later than the present time,
set a temporary schedule information where an ending time of the temporary schedule information is the starting time of the schedule information;
determine whether a time remaining until the ending time of the temporary schedule information is the reference time or more;
in response to determining that the time remaining until the ending time of the temporary schedule information is the reference time or more, cause the display to display the ending time of the temporary schedule information; and
in response to determining that the time remaining until the ending time of the temporary schedule information is not the reference time or more, cause the display to display a time remaining until the ending time of the temporary schedule information instead of the ending time of the temporary schedule information.

3. The display device according to claim 1,
wherein the display comprises a hand display, and
wherein the at least one processor is configured to:
determine whether the time remaining until the ending time of the schedule information is equal to or longer than a preset time;
in response to determining that the time remaining until the ending time of the schedule information is not equal to or longer than the preset time, cause the hand display to display the time remaining until the ending time of the schedule information; and
in response to determining that the time remaining until the ending time of the schedule information is equal to or longer than the preset time, cause the hand display to display that the time remaining until the ending time of the schedule information is equal to or longer than the preset time.

4. The display device according to claim 3, further comprising the display,
wherein the hand display comprises:
a sub-dial; and
a hand provided in a reciprocatively movable manner in clockwise and counterclockwise directions with respect to a rotation axis of the sub-dial.

5. The display device according to claim 1,
wherein the ending time of the schedule information is a time within a set time from the present time.

6. An electronic watch comprising:
the display device according to claim 1; and
an attacher configured to attach the display device to a user's body.

7. The display device according to claim 1,
wherein the at least one processor is configured to:
determine whether a predetermined user input has been input; and
in response to determining that the predetermined user input has been input, determine whether the time remaining until the ending time is the reference time or more.

8. A display method comprising:
acquiring schedule information including of a starting time and of an ending time;
determining that the starting time is earlier than a present time and the ending time is later than the present time; and
in response to determining that the starting time is earlier than the present time and the ending time is later than the present time,
determining whether a time remaining until the ending time of the schedule information is a reference time or more;
in response to determining that the time remaining until the ending time of the schedule information is the reference time or more, causing a display to display the ending time of the schedule information; and
in response to determining that the time remaining until the ending time of the schedule information is not the reference time or more, causing the display to display the time remaining until the ending time of the schedule information instead of the ending time of the schedule information.

9. The display method according to claim 8, further comprising,
in response to determining that the starting time of the schedule information is not earlier than the present time and the ending time of the schedule information is later than the present time,
setting a temporary schedule information where an ending time of the temporary schedule information is the starting time of the schedule information;
determining whether a time remaining until the ending time of the temporary schedule information is the reference time or more;
in response to determining that the time remaining until the ending time of the temporary schedule information is the reference time or more, causing the display to display the ending time of the temporary schedule information; and
in response to determining that the time remaining until the ending time of the temporary schedule information is not the reference time or more, causing the display to display a time remaining until the ending time of the temporary schedule information instead of the ending time of the temporary schedule information.

10. The display method according to claim 8, wherein the display comprises a hand display, and wherein the display method further comprises:
    determining whether the time remaining until the ending time of the schedule information is equal to or longer than a preset time;
    in response to determining that the time remaining until the ending time of the schedule information is not equal to or longer than the preset time, causing the hand display to display the time remaining until the ending time of the schedule information; and
    in response to determining that the time remaining until the ending time of the schedule information is equal to or longer than the preset time, causing the hand display to display that the time remaining until the ending time of the schedule information is equal to or longer than the preset time.

11. The display method according to claim 8, further comprising:
    determining whether a predetermined user input has been input; and
    in response to determining that the predetermined user input has been input, determining whether the time remaining until the ending time is the reference time or more.

12. A non-transitory recording medium storing a program causing a processor to at least perform:
    acquiring schedule information including a starting time and an ending time;
    determining whether the starting time of the schedule information is earlier than a present time and the ending time of the schedule information is later than the present time; and
    in response to determining that the starting time of the schedule information is earlier than the present time and the ending time of the schedule information is later than the present time,
        determining whether a time remaining until the ending time of the schedule information is a reference time or more;
        in response to determining that the time remaining until the ending time of the schedule information is the reference time or more, causing a display to display the ending time of the schedule information; and
        in response to determining that the time remaining until the ending time of the schedule information is not the reference time or more, causing the display to display the time remaining until the ending time of the schedule information instead of the ending time of the schedule information.

13. The non-transitory recording medium according to claim 12,
    wherein the program causes the processor to at least perform:
        in response to determining that the starting time of the schedule information is not earlier than the present time and the ending time of the schedule information is later than the present time,
            setting a temporary schedule information where an ending time of the temporary schedule information is the starting time of the schedule information;
            determining whether a time remaining until the ending time of the temporary schedule information is the reference time or more;
            in response to determining that the time remaining until the ending time of the temporary schedule information is the reference time or more, causing the display to display the ending time of the temporary schedule information; and
            in response to determining that the time remaining until the ending time of the temporary schedule information is not the reference time or more, causing the display to display a time remaining until the ending time of the temporary schedule information instead of the ending time of the temporary schedule information.

14. The non-transitory recording medium according to claim 12,
    wherein the display comprises a hand display, and
    wherein the program causes the processor to at least perform:
        determining whether the time remaining until the ending time of the schedule information is equal to or longer than a preset time;
        in response to determining that the time remaining until the ending time of the schedule information is not equal to or longer than the preset time, causing the hand display to display the time remaining until the ending time of the schedule information; and
        in response to determining that the time remaining until the ending time of the schedule information is equal to or longer than the preset time, causing the hand display to display that the time remaining until the ending time of the schedule information is equal to or longer than the preset time.

15. The non-transitory recording medium according to claim 12,
    wherein the program causes the processor to at least perform:
        determining whether a predetermined user input has been input; and
        in response to determining that the predetermined user input has been input, determining whether the time remaining until the ending time of the schedule information is the reference time or more.

* * * * *